(No Model.)
W. LOUDEN.
HAY ELEVATOR AND CARRIER.
No. 328,896. Patented Oct. 20, 1885.
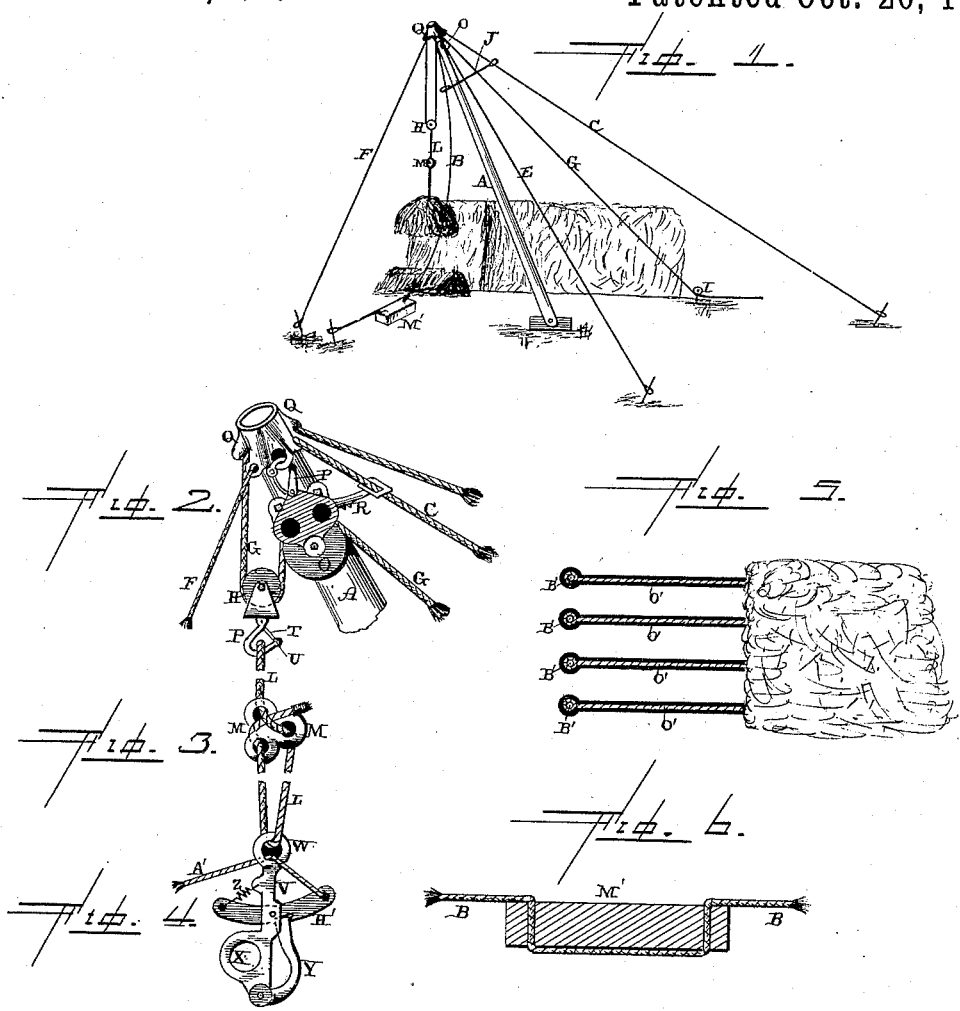
Witnesses.
R. L. Gardner
Jos. E. Prosperi
Inventor.
Wm. Louden,
per
F. A. Lehmann,
atty.

UNITED STATES PATENT OFFICE.

WILLIAM LOUDEN, OF FAIRFIELD, IOWA.

HAY ELEVATOR AND CARRIER.

SPECIFICATION forming part of Letters Patent No. 328,896, dated October 20, 1885.

Application filed August 18, 1885. Serial No. 174,753. (No model.)

*To all whom it may concern:*

Be it known that I, WILLIAM LOUDEN, of Fairfield, in the county of Jefferson and State of Iowa, have invented certain new and useful Improvements in Hay Elevators and Carriers; and I do hereby declare the following to be a full, clear, and exact description of the invention, such as will enable others skilled in the art to which it pertains to make and use it, reference being had to the accompanying drawings, which form part of this specification.

My invention relates to an improvement in hay elevators and carriers; and it consists in the arrangement and combination of parts, which will be more fully described hereinafter, whereby hay can be taken from the ground, wagon, or rake and piled up in stacks or in mows of any desired shape and length.
This invention is intended, principally, as an improvement upon the patents granted to me July 24, 1883, No. 282,003, and May 6, 1884, No. 298,218; but a portion of the improvements herein described are adapted to other forms of elevators.

Figure 1 is a side elevation of an elevator and carrier embodying my invention. Figs. 2, 3, 4, 5, and 6 are detail views of different parts.
A represents the pivoted pole, and B, C, E, and F the guy-ropes by which it is supported in position, as is fully shown and described in the two patents above referred to. The elevator-rope G passes up over a suitable pulley at the top of the pole A, then through a suitable sheave, H, and then is fastened at its upper end to the top of the pole, while its outer end passes under a guide-pulley, I, and is attached to the horse or other motive power that does the hoisting.

Fastened to the two guy-ropes B C, near their upper ends, is a short cord or strap, J, which serves to connect the two ropes together and to draw the slack guys away from the track. As the guys B C are alternately slack and tight, according to the movement of the pole A, this cord or strap J causes the tight guy to draw the slack of the loose guy out of the way of the builder on the stack and the operator while managing the hay fork or sling.

Attached to the pulley H on the draft-rope G is the rope L, which passes down through one or two of the eyes of the casting M, then through the ring at the top of the hay fork or sling, then up through the lower eye or eyes of the casting M, and in between the casting and that portion of the rope where it passes through the upper eyes. The frictional contact of the rope, both upon the eye and upon itself, serves to hold the fork at any desired elevation. Whenever it is desired to either raise or lower the fork, the casting is drawn up on the rope or the loose end is drawn further through the casting, according to the height that it is desired to give the fork. This casting M for holding the fork can be used on a regular track-carrier as well as on a swinging pole or frame, but is especially adapted for stacking hay, as here shown. Instead of the casting having three eyes, as here shown, it may only have two eyes, if so desired, in which case the main part of the rope will have to be passed half round the casting and under the loose end.

Upon the guy-rope B is placed a weight, M', which consists of a piece of wood or other suitable material, which has holes made through it near each of its ends, and through which holes the guy B passes. By boring two holes through the piece of wood and passing the rope through them, as shown, it is easy to adjust the weight upon the rope; and it occupies the least perpendicular space, and can be easily and quickly adjusted back and forth along the rope.

The draft-rope G passes over the guiding-pulley O, which is suspended by a suitable hook, P, from the collar Q on the upper end of the pole.

The locking-dog R, instead of being attached directly to one of the guys, as shown in my patent of May 6, 1884, here has the guy-rope C to pass through an eye on the end of the dog, and is then secured directly to one of the eyes in the collar, as shown. When the guy is slackened the dog R drops on the draft-rope C and holds it from passing back. The tightening of the guy raises the dog and releases the draft-rope. By this construction the guy-rope C serves both to support the pole and to operate the locking-dog.

The hook P, which is attached both to the pulley H, and which supports the pulley O in position, is provided with a movable or pivoted point, T. When open, the smaller projection U or its equivalent prevents the point from moving too far downward, and thus insures a good point for an open hook. When closed, the outer end, having a hole in it, passes into a slot in the main part of the hook, which also has a hole corresponding with the hole in the movable point T. By placing a key or pin through the hook and the point, the point is held securely closed, so as to prevent it from opening. This hook is especially suitable for a swinging elevator and carrier, and also for the trip-pulley used in ordinary track-carriers.

The slide-holder V, by means of which the sling-ropes are held in position while lifting the hay, and by which they are released to discharge the hay, has a suitable eye, W, at its upper end, and one or more eyes, X, to one side at its lower end.

Pivoted to one end of the main portion V of the sling-holder is the drop Y, which has its upper end to catch in a suitable recess, which is specially made to receive it in the edge of the body V, and is held in a vertical or closed position by means of the catch H', which is pivoted upon the body, as shown.

To one end of the catch and to the body V is secured a spring, Z, which serves to return the catch to position whenever it is drawn upward by means of the rope A' at the opposite end for the purpose of releasing the drop Y. The body V is recessed or flanged at its edge for the purpose of preventing the drop Y from having any lateral movement or being bent when any undue strain is brought to bear upon it.

The operation of the sling is as follows: Take two or more ropes, each having a smooth loop on one end, and these ropes are placed below the hay to be elevated, the drop Y being opened, the loops of the ropes are looped over it and then it is closed and locked in that position by means of the catch or its equivalent. The other ends of the ropes are then passed through the eye, or eyes X, and drawn tight and tied in a bow or slip knot. When the hay is lifted and carried to the proper place, a pull on the cord or rope A' will raise the catch and release the drop Y, so as to allow the looped ends of the ropes to drop and discharge the hay.

The hay may be brought to the track on a wagon, a hay-slide, a sweep-rake, or be dragged up in the hay-cock. When brought in the two former ways, the sling-ropes are laid on the wagon, rack, or hay-slide, and then the hay built on them; but when brought in the sweep-rake or in the hay-cock, the sling-ropes have to be laid on the ground, or on a platform, and the hay drawn over them. In order to facilitate this operation and make my elevator and carrier complete, I prepare the place in which to lay the ropes, so that they will not be dragged away by drawing the hay over them. One way is to dig four, more or less, small holes eight or ten feet from the stack, and in each hole drive a small stake, B', so that its end will not come above the level of the ground. Over these stakes B' are looped the sling-ropes O', as shown.

If necessary, small trenches can be dug in the ground in which to lay the ropes, and in this way the hay can be drawn over the ropes without disturbing them.

A large sweep-rake load can be elevated and deposited on the stack in two swinging loads, or in one, if so desired.

A platform can be made having recesses in which the sling-ropes are laid, so that the hay will not disturb the ropes by being drawn over them.

In order to part the hay readily into two sling-loads when brought to the stack with the sweep-rakes, a dividing device can be made in the rake by putting a triangular piece or a brace through the center tooth, so the hay will be drawn over it and make it part readily.

Having thus described my invention, I claim—

1. In a stacking device, the combination of the pivoted pole with the guy-ropes and the short cord or strap J for securing the two guy-ropes B C together at their upper ends, substantially as shown.

2. The combination of the guy-rope B with the weight M, which has a hole through each of its ends, and which weight can be adjusted back and forth on the rope, substantially as set forth.

3. The combination of the locking-dog R, having an eye at one end for the rope C to pass through, with the pulley O, over which the draft-rope passes, substantially as shown.

4. The casting M, having two or more eyes, in combination with the rope L for supporting the fork or sling, whereby the rope L can be readily lengthened or shortened, according to the position to which it is desired to adjust the fork or sling, substantially as set forth.

5. In a hay elevator and carrier, the combination of the hook P with the pivoted point T, the end of the pivoted point being adapted to enter a slot in the body of the hook and be held in a closed position, substantially as shown.

6. The combination of the hook P with the pivoted point T, provided with the stop or projection U, substantially as specified.

7. The combination of the sling-holder V, provided with the eyes W X, and the trip Y, with the catch which locks the trip in place, substantially as described.

8. The combination of the sling-holder V, provided with the eyes W X, and the trip Y, the body of the holder being recessed to receive the end of the trip, substantially as described.

9. The combination of the sling-ropes O' and the pins or pegs B', the pegs being driven into the ground so that their upper ends will not project above its surface, and the ropes being laid in recesses prepared to receive them, so that they will not be disturbed by the slide or rake, substantially as described.

10. In combination with sling-ropes for elevating hay, the stakes set in holes for the purpose of looping the ropes over the stakes, substantially as and for the purpose set forth.

In testimony whereof I affix my signature in presence of two witnesses.

WILLIAM LOUDEN.

Witnesses:
R. B. LOUDEN,
F. S. FREEMAN.